Nov. 4, 1969  R. T. CORNELIUS  3,476,395
SHAFT SEAL ASSEMBLY
Filed Nov. 9, 1967
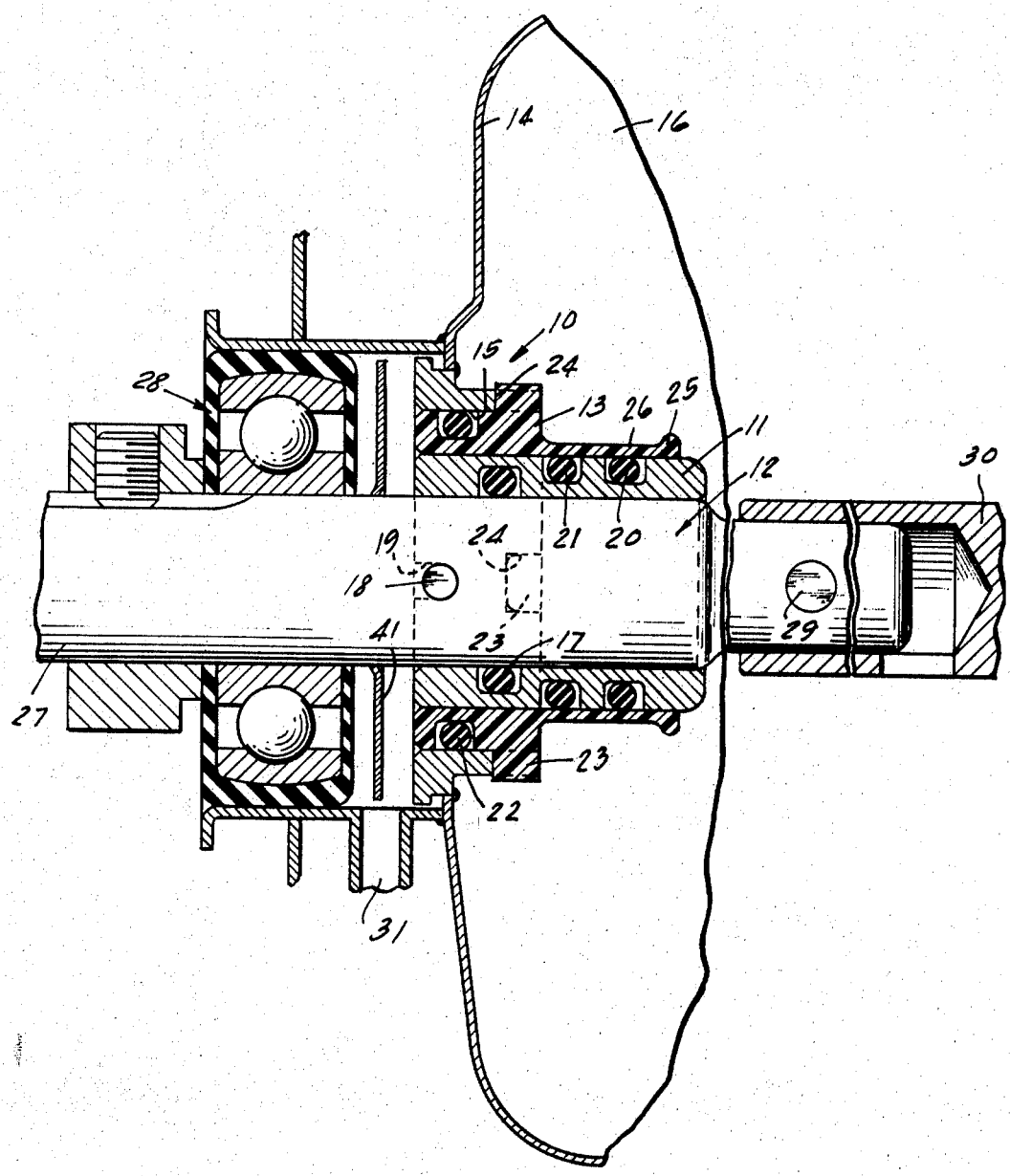
INVENTOR.
RICHARD T. CORNELIUS
BY *Hill, Sherman, Meroni, Gross & Simpson* ATTORNEYS 3,476,395
SHAFT SEAL ASSEMBLY
Richard T. Cornelius, Minneapolis, Minn., assignor to The Cornelius Company, Anoka, Minn., a corporation of Minnesota
Filed Nov. 9, 1967, Ser. No. 681,716
Int. Cl. F16j 15/34, 15/54
U.S. Cl. 277—35                                      16 Claims

ABSTRACT OF THE DISCLOSURE

A pair of concentric sleeves have a dynamic seal therebetween, the inner sleeve having a static seal with a shaft with which it is corotatable, and the outer sleeve having a static seal with the housing to which it is locked, each of the sleeves being manually slidable with respect to each other, to the housing, and to the shaft for removal or installation, the sleeves being removable as a seal assembly.

SUMMARY OF THE INVENTION

This invention pertains to a shaft seal assembly which is fluid-pressure-tight and which is manually removable.

BACKGROUND

Concentric sleeves have a dynamic seal therebetween and are mountable as a unit on a shaft extending through an opening in a housing, the sleeves being axially slidable with respect to each other, with respect to the shaft, and with respect to the housing and having abutment means for limiting such axial sliding movement and precluding angular movement except between each other.

Accordingly, it is an object of the present invention to provide a fluid-pressure-tight shaft seal assembly.

Another object of the present invention is to provide a shaft seal assembly which can be removed or installed manually without the use of any tools.

Another object of the present invention is to provide a shaft seal assembly wherein neither the housing nor the shaft has any surface that is exposed to wear on account of shaft rotation.

Yet another object of the present invention is to provide a shaft seal assembly which will require no lubrication.

A further object of the present invention is to provide a shaft seal assembly arranged to be cooled by liquid which it seals.

A still further object of the present invention is to provide a shaft seal assembly for sealing against fluid pressure wherein the fluid pressure serves to complete the positioning or installation of the shaft seal assembly if such were not manually done previously.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWING

The drawing illustrates a shaft seal assembly in association with a shaft and a housing, provided in accordance with the principles of the present invention.

AS SHOWN ON THE DRAWING

The principles of the present invention are particularly useful when embodied in a preferred form of shaft seal assembly generally indicated by the numeral 10 on the drawing. The shaft seal assembly 10 comprises a fluid-pressure-tight seal assembly and to this end includes a first sleeve 11 carried on a shaft 12, and a second sleeve 13 disposed on the first sleeve 11 within an opening in a housing 14. The housing 14 has means indicated at 15 defining such cylindrical opening, the means 15 here comprising a tubular portion secured as by a weld to the housing 14. The interior of the housing 14 defines a pressurizable chamber 16, and the seal assembly 10 prevents fluid leakage between the shaft 12 and the housing 14 through any portion of the opening 15.

The sleeve 11 is freely axially slidable on the shaft 12 and has an internal groove which receives a static seal 17 in the form of an O-ring which is slightly compressed in radial cross-section in response to being assembled with the shaft 12. A pair of abutting surfaces is provided which preclude angular movement of the sleeve 11 about the axis of the shaft 12, and which limit the axial sliding movement of the sleeve 11 to the position illustrated. To this end, the shaft 12 has a pin 18 which projects radially therefrom, the projecting ends being received in a pair of grooves or slots 19 in the sleeve 11, the slots 19 being open in the low-pressure direction. Fluid pressure in the chamber 16 acts on the sleeve 11, tending to move it axially outwardly through the opening 15. If the pin 18 is not received within the groove 19 when the seal assembly 10 is first assembled, the sleeve 11 will tend to remain stationary during rotation of the shaft 12 while fluid pressure acts on the inner end of the sleeve 11. However, as soon as the pin 18 is aligned with the slot 19, such fluid pressure would shift the sleeve 11 in an axial direction into a locking arrangement with the pin 18.

The second sleeve 13 is axially slidable on the outside of the sleeve 11, there being a close running fit therebetween which includes in this embodiment a pair of dynamic seals 20, 21. In this embodiment, the seals 20, 21 comprise O-rings carried in grooves on the outside of the sleeve 1 and are urged due to their compression and to fluid pressure into sealing engagement with both of the sleeves 11, 13. The sleeve 13 has a static seal 22 at its outer side cooperating with that portion of the housing that defines the cylindrical opening at 15.

A second pair of abutting surfaces is provided which act between the second sleeve 13 and the housing 14 to preclude relative angular rotation, and to limit the axial movement of the sleeve 13. To this end, the sleeve is provided with a group of four radially outwardly projecting tabs 23 which are jointly receivable into a set of correspondingly sized and located grooves 24 disposed at the high-pressure side of the housing opening 15. In the event that the tabs 23 are not received in the grooves 24 during assembly, there is a tendency for the seal assembly 10 to rotate, and when the tabs 23 are aligned with the grooves 24, fluid pressure at the high pressure side of the seal assembly 10 shifts the second sleeve 13 in an axial direction to the position illustrated.

If pressure is applied when either of the pairs of abutments 18, 19 or 23, 24 are not engaged, both of the static seals 17, 22 and the dynamic seals 20, 21 are all in sealing relationship.

In this embodiment, the sleeve 13 comprises plastic, a preferred plastic being one which has natural lubricity, such as nylon or "Teflon." Moreover, with the use of such a material there is minimized any tendency for any liquid in the chamber 16 to stick to the sleeve 13.

The innermost end of the sleeve 13 is preferably provided with radially projecting gripping means 25, here shown in the form of a rib of circular construction. If desired, the radial extent of this rib 25 could be made greater than that illustrated. At any event, the means 25 enables grasping of that end of the outer sleeve 13 for axial withdrawal. The frictional resistance of the dynamic seal 20, 21, partly due to the close running fit between the sleeves 11, 12, is greater than the combined frictional resistance of the static seals 17, 22 to axial sliding movement. Thus as the outer sleeve 13 is withdrawn, the inner sleeve will follow along. In the same manner, when the sleeve 11, 13 are installed as a unit, the inner sleeve 11 will also follow along. However, if it were desired, the inner sleeve 11 could be provided with axially spaced structure such as shown at 25 for the same purpose.

A portion of the outer sleeve 13 has a reduced thickness 26 which extends about the dynamic seal 20, 21 for at least part of the axial extent of such dynamic seal. Sliding friction acting on the dynamic seal 20, 21 creates heat, but such heat is readily conducted through the reduced thickness portion 26 for transfer to a cooler liquid which surrounds the assembly 10 which thereby cools the seal assembly 10. The portion of the sleeve that has the reduced thickness 26 is to some extent constrictable by the action of fluid pressure on the outside of the sleeve 13, thereby assuring a good sealing force.

The resulting seal assembly 10 is particularly adapted to be utilized with food products owing to the sanitary nature of its construction and the ease with which it may be removed for cleaning, inspection or replacement. This feature is particularly important as sanitary seals are absolutely essential in the food and beverage industry. Moreover, the seal can be readily removed and replaced by inexperienced personnel without any hand tools, and reinstallation, if slightly faulty, is self-correcting as explained.

In an actual installation, an end 27 of the shaft 12 may be driven, and supported by a self-aligning bearing assembly 28, while the inner end of the shaft 12 may be provided with a pin 29 which forms part of a bayonet connection with a readily removable inner shaft 30 which may be part of a stirrer. The housing 14 may be opened at the opposite end so that manual access to the interior thereof is readily obtained.

Between the self-aligning bearing 28 and the seal assembly 10 there is provided a slinger 41 which not only protects the seal assembly 10 from any lubrication that may be in the vacinity of the bearing 28, but it also protects the bearing 28 against any product that might escape past a failed seal assembly 10. Such failure is detected by dripping of a liquid product from a normally dry outlet 31.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A fluid-pressure-tight seal assembly for use between a housing and a relatively rotatable shaft extending through a wall of the housing, comprising:
   (a) a first sleeve arranged to be carried on the shaft in an axially slidable manner and to have a static seal therebetween;
   (b) a second sleeve carried on said first sleeve in an axially slidable manner and having a dynamic seal therebetween, said second sleeve being arranged to extend in an axially slidable manner through means defining a cylindrical opening in the housing wall and to have a static seal therebetween; and
   (c) radially projecting gripping means on one of said sleeves for use in axially removing said one sleeve.

2. A fluid-pressure-tight seal assembly for use between a housing and a relatively rotatable shaft extending through a wall of the housing, comprising:
   (a) a first sleeve arranged to be carried on the shaft in an axially slidable manner and to have a static seal therebetween, said sleeve having at least one radially outwardly opening groove;
   (b) a dynamic seal disposed in said groove;
   (c) a second sleeve rotatably carried on the outside of said first sleeve in an axially slidable manner and having a bore in sealing engagement with said dynamic seal, said second sleeve being arranged to extend in an axially slidable manner through means defining a cylindrical opening in the housing wall and to have a static seal therebetween;
   (d) said second sleeve having an exposed portion of reduced thickness overlying said dynamic seal and facing radially outwardly for being disposed in axially spaced relation to the housing opening.

3. A seal assembly according to claim 2 wherein said exposed portion of said second sleeve is radially inwardly constrictable in response to fluid pressure applied to the outside of said exposed portion.

4. A seal assembly according to claim 2 wherein the constrictability of said second sleeve is provided by said second sleeve's being constructed of plastic material.

5. A fluid-pressure-tight seal assembly, comprising:
   (a) a housing having means defining a cylindrical opening in a wall thereof;
   (b) a relatively rotatable shaft extending through said open;
   (c) a first sleeve carried on said shaft in an axially slidable manner and having a static seal therebetween;
   (d) a second sleeve carried on said first sleeve in said opening in an axially slidable manner with respect to said first sleeve and said housing, and having a dynamic seal between said sleeves and a static seal with said opening-defining means; and
   (e) a pair of abutting surfaces on said shaft and said first sleeve to preclude movement therebetween.

6. A seal assembly according to claim 5, wherein said abutting surfaces limit axial movement of said first sleeve in response to fluid pressure.

7. A seal assembly according to claim 5, wherein said abutting surfaces render said shaft and said first sleeve corotatable.

8. A seal assembly according to claim 5, wherein said abutting surfaces render said shaft and said first sleeve corotatable and also limit axial movement of said first sleeve in response to fluid pressure.

9. A seal assembly according to claim 5, wherein said abutting surfaces comprises a radially projecting pin on said shaft and a groove in said first sleeve, said groove being axially open at one end.

10. A seal assembly according to claim 5, having a second pair of abutting surfaces on said housing and said second sleeve to preclude angular movement therebetween.

11. A fluid-pressure-tight seal assembly, comprising:
   (a) a housing having means defining a cylindrical opening in a wall thereof;
   (b) a relatively rotatable shaft extending through said opening;
   (c) a first carried on said shaft in an axially slidable manner and having a static seal therebetween;
   (d) a second sleeve carried on said first sleeve in said opening in an axially slidable manner with respect to said first sleeve and said housing, and having a dynamic seal between said sleeves and a static seal with said opening-defining means; and
   (e) a pair of abutting surfaces on said housing and said second sleeve to preclude movement therebetween.

12. A seal assembly according to claim 11, wherein said abutting surfaces limit axial movement of said second sleeve in response to fluid pressure.

13. A seal assembly according to claim 11, wherein said abutting surfaces render said second sleeve angularly fixed with respect to said housing.

14. A seal assembly according to claim 11, wherein said abutting surfaces render said second sleeve angularly fixed with respect to said housing, and also limit axial movement of said second sleeve in response to fluid pressure.

15. A seal assembly according to claim 14, wherein said abutting surfaces comprise at least one radially outwardly projecting tab on said second sleeve and a groove in said housing, said groove being axially open at one end.

16. A seal assembly according to claim 1, wherein the frictional resistance to axial sliding movement at said dynamic seal is so much greater than the combined frictional resistances to axial sliding movement is at said static seals, that on axial movement of said one sleeve for removal, both of said sleeves move as an assembly.

References Cited

UNITED STATES PATENTS

| | | | |
|---|---|---|---|
| 1,826,057 | 10/1931 | Dobbins | 277—58 |
| 2,479,711 | 8/1949 | Arutunoff | 277—37 |
| 2,571,500 | 10/1951 | Trevaskis | 277—237 X |
| 2,690,939 | 10/1954 | Whaley | 277—58 X |
| 2,825,590 | 3/1958 | Sutherland | 277—35 X |
| 3,224,817 | 12/1965 | Miller et al. | 277—35 X |
| 3,331,609 | 7/1967 | Moran | 277—137 X |
| 3,351,350 | 11/1967 | Shepler | 277—58 |

JAMES KEE CHI, Primary Examiner

U.S. Cl. X.R.

277—37

UNITED STATES PATENT OFFICE
CERTIFICATE OF CORRECTION

Patent No. 3,476,395　　　　　　　　　　Dated November 4, 1969

Inventor(s)　Richard T. Cornelius

It is certified that error appears in the above-identified patent and that said Letters Patent are hereby corrected as shown below:

Col. 1, lines 23 and 26, transpose "SUMMARY OF THE INVENTION" and "BACKGROUND";

change " " to -- 13 --;

Col. 4, line 27, change "open" to -- opening --;

Col. 4, line 61, after "first" insert -- sleeve --.

**SIGNED AND
SEALED
JUN 23 1970**

(SEAL)
Attest:

Edward M. Fletcher, Jr.　　　　　　　　WILLIAM E. SCHUYLER, JR.
Attesting Officer　　　　　　　　　　　Commissioner of Patents